P. McALEER.
Cigar-Box for Preventing Revenue Frauds.
No. 225,848. Patented Mar. 23, 1880.
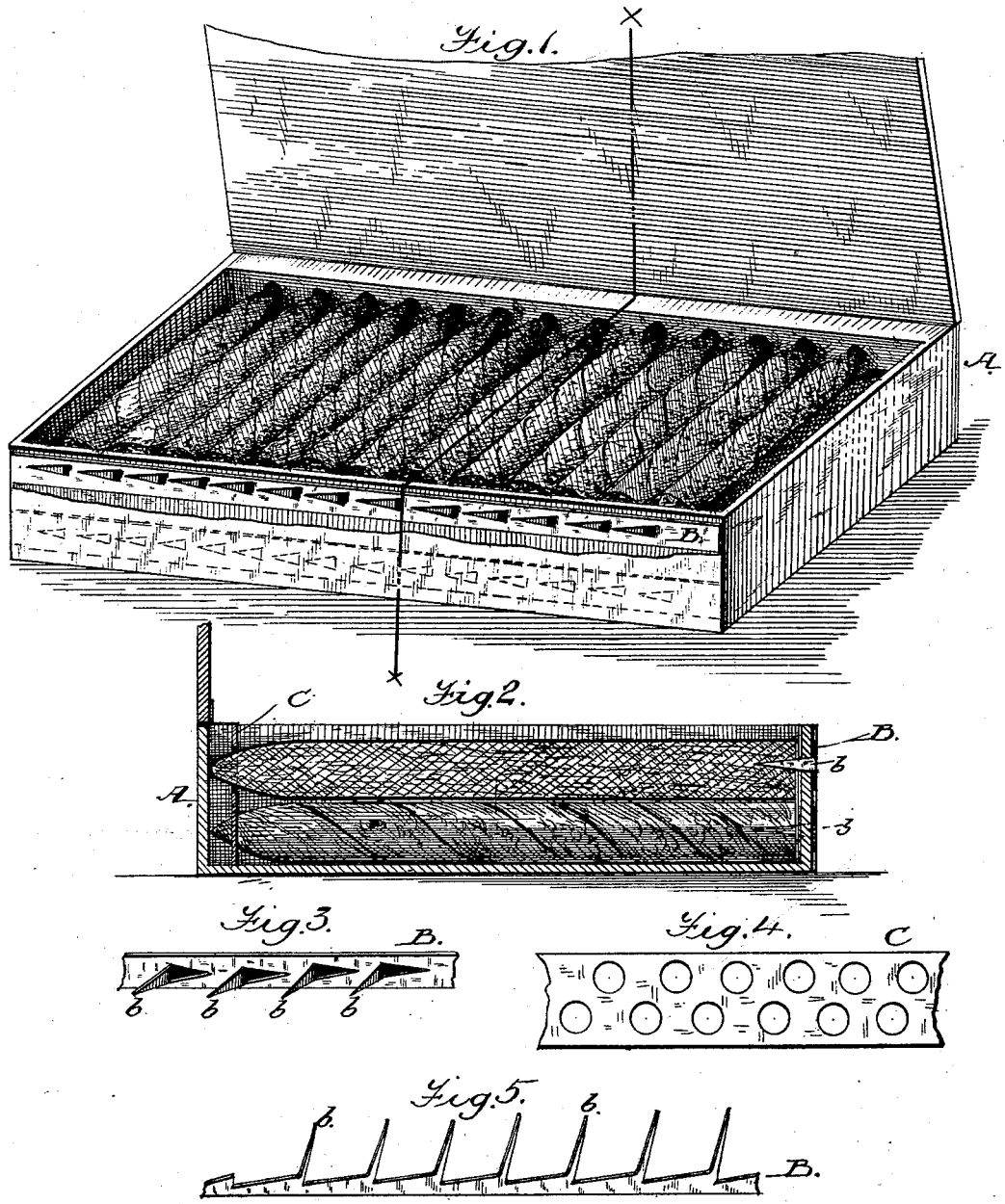

UNITED STATES PATENT OFFICE.

PHILIP McALEER, OF WASHINGTON, DISTRICT OF COLUMBIA.

CIGAR-BOX FOR PREVENTING REVENUE FRAUDS.

SPECIFICATION forming part of Letters Patent No. 225,848, dated March 23, 1880.

Application filed February 10, 1880.

*To all whom it may concern:*

Be it known that I, PHILIP McALEER, of Washington city, in the District of Columbia, have invented a new and useful Improvement in the Manufacture of Cigar-Boxes, whereby the cigars may be packed and secured, in connection with the legal stamp, in a manner to prevent frauds upon the revenue; and I hereby declare that the following is a clear, full, and exact description thereof, reference being had to the accompanying drawings, making a part of this specification, in which—

Figure 1 represents a perspective view of a cigar-box with my improvement attached. Fig. 2 is a cross-section of the same. Figs. 3, 4, and 5 show details to be referred to.

My improvement has reference to cigar-boxes so constructed that the cigars cannot be removed without destroying the government revenue-stamp, and that the boxes, after being once used, cannot be refilled, so as to perpetrate a fraud on the revenue; and the invention consists in the combination of devices hereinafter described and claimed.

To enable others skilled in the art to make and use my invention, I will proceed to describe the exact manner in which I have carried it out.

Heretofore it has been found impossible to prevent fraud in collecting the revenue on cigars; but my device effectually prevents fraud, as it secures the destruction of the stamp as each cigar is taken from the box, and the box is so constructed that it is impossible for a cigar to be extracted by any means that could not be readily detected by the most casual observer.

My invention is inexpensive and simple, convenient for packing and transportation, and offers no obstruction to the facilities of legitimate trade in the manufacture or sale of cigars, while it defeats the object of smuggling from foreign ports by completely and successfully preventing the fraudulent practice now in operation of refilling the boxes.

In the drawings, A represents an ordinary cigar-box filled with cigars. Along one side of the box is placed the metal strip B, cut or clipped, as shown in Fig. 3 or 5, so as to produce a series of tongues, *b*, which pass through the wood of the box and enter the large ends of the cigars, as shown in Fig. 2. The strips B may be inserted in grooves made in the box, and be placed flush with the exterior surface of the box. When the cigars and the strips are in place the latter are covered by the revenue-stamp, and cannot be removed without first destroying the stamp. The strips may be withdrawn, (the act necessitating the destruction of the stamp,) so as to release the cigars one by one, thus leaving all cigars not sold from the box undisturbed, while it is impossible to refill the box without exposing the fraud.

On the side of the box opposite to the metal strips B, I place a thin board, C, of any suitable material, perforated, as shown in Fig. 4, for the reception of the small ends of the cigars. This board C sets in from the side of the box only enough to take a good hold on the cigars, as shown in Fig. 2. These perforations do not pass through the side of box, but may be made sufficiently deep on the inside of the box to receive and hold the small ends of the cigars.

It is evident from this description that a cigar placed in the box with the small end passed through the board C and the large end penetrated by the tongue *b* cannot be removed therefrom, except by the destruction of the cigar or by the removal of the tongue, which would be surely indicated by the destruction of that portion of the stamp over the metal strip and opposite the tongue.

I do not confine myself to any particular form of metal strips or tongues, as these may be greatly varied to suit different parties.

I am aware it is not new to pass pins through a strip and the side of the box into the large ends of the cigars, or to perforate the opposite side of the box for the purpose of drawing out the cigars through such perforations. Such devices are shown in the patent to Ellis, No. 165,664, and I do not claim such as my invention; but, Having described my invention, what I claim as new, and desire to secure by Letters Patent, is—

A cigar-box constructed as described, provided at one side with a board having perforations to receive the small ends of the cigars, while to the opposite side of the box is attached a longitudinal strip having tongues cut integral therewith, said tongues passing through the side of the box, and adapted to engage the larger ends of the cigars, whereby the cigars are held in position, to prevent, in connection with the legal stamp, frauds upon the revenue.

PHILIP McALEER.

Witnesses:
W. H. MORSELL,
R. K. EVANS.